United States Patent
Ohsawa et al.

(10) Patent No.: US 10,923,705 B2
(45) Date of Patent: Feb. 16, 2021

(54) METHOD OF PRODUCING NEGATIVE ELECTRODE FOR NONAQUEOUS ELECTROLYTE SECONDARY BATTERY AND METHOD OF PRODUCING NONAQUEOUS ELECTROLYTE SECONDARY BATTERY

(71) Applicant: TOYOTA JIDOSHA KABUSHIKI KAISHA, Toyota (JP)

(72) Inventors: Ryosuke Ohsawa, Okazaki (JP); Kaoru Inoue, Hirakata (JP); Naoto Onodera, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 62 days.

(21) Appl. No.: 15/977,225

(22) Filed: May 11, 2018

(65) Prior Publication Data
US 2018/0342728 A1    Nov. 29, 2018

(30) Foreign Application Priority Data
May 26, 2017    (JP) .................................. 2017-104869

(51) Int. Cl.
*H01M 4/00*    (2006.01)
*H01M 4/04*    (2006.01)
(Continued)

(52) U.S. Cl.
CPC ......... *H01M 4/0404* (2013.01); *H01M 4/133* (2013.01); *H01M 4/1393* (2013.01);
(Continued)

(58) Field of Classification Search
None
See application file for complete search history.

(56) References Cited

U.S. PATENT DOCUMENTS

| 2007/0048613 A1* | 3/2007 | Yanagida | H01M 4/66 429/245 |
| 2010/0068612 A1* | 3/2010 | Nishikawa | H01M 2/145 429/129 |

(Continued)

FOREIGN PATENT DOCUMENTS

| JP | 2000-003730 A | 1/2000 |
| JP | 2002-164052 A | 6/2002 |

(Continued)

*Primary Examiner* — David P Turocy
*Assistant Examiner* — Mohammad Mayy
(74) *Attorney, Agent, or Firm* — Oliff PLC

(57) ABSTRACT

A negative electrode active material, a first carbon material, a thickener, and a solvent are mixed to prepare a first dispersion solution. The first dispersion solution and a second carbon material are mixed to prepare a second dispersion solution. The second dispersion solution and a binder are mixed to prepare a negative electrode paint. The negative electrode paint is applied to a surface of a negative electrode current collector and dried to produce a negative electrode for a nonaqueous electrolyte secondary battery. The negative electrode active material has a BET specific surface area of 3 $m^2/g$ or more and 8 $m^2/g$ or less. The first carbon material has a BET specific surface area of 30 $m^2/g$ or more and 100 $m^2/g$ or less. The second carbon material has a BET specific surface area of 200 $m^2/g$ or more and 500 $m^2/g$ or less.

18 Claims, 5 Drawing Sheets

(51) Int. Cl.
    *H01M 4/587*    (2010.01)
    *H01M 4/62*     (2006.01)
    *H01M 4/1393*   (2010.01)
    *H01M 10/0525*  (2010.01)
    *H01M 4/133*    (2010.01)
    *H01M 4/02*     (2006.01)

(52) U.S. Cl.
    CPC ........... *H01M 4/587* (2013.01); *H01M 4/622* (2013.01); *H01M 4/625* (2013.01); *H01M 10/0525* (2013.01); *H01M 2004/021* (2013.01); *H01M 2004/027* (2013.01); *H01M 2220/20* (2013.01)

(56) References Cited

U.S. PATENT DOCUMENTS

2017/0098817 A1* 4/2017 Yu ..................... H01M 4/139
2017/0222218 A1   8/2017 Sasaki et al.

FOREIGN PATENT DOCUMENTS

| JP | 2014-139920 A | 7/2014 |
| JP | 2014-194927 A | 10/2014 |
| JP | 2016-051655 A | 4/2016 |
| WO | 2014/092141 A1 | 6/2014 |

* cited by examiner

METHOD OF PRODUCING NEGATIVE ELECTRODE FOR NONAQUEOUS ELECTROLYTE SECONDARY BATTERY AND METHOD OF PRODUCING NONAQUEOUS ELECTROLYTE SECONDARY BATTERY

INCORPORATION BY REFERENCE

The disclosure of Japanese Patent Application No. 2017-104869 filed on May 26, 2017 including the specification, drawings and abstract is incorporated herein by reference in its entirety.

BACKGROUND

1. Technical Field

The present disclosure relates to a method of producing a negative electrode for a nonaqueous electrolyte secondary battery and a method of producing a nonaqueous electrolyte secondary battery.

2. Description of Related Art

WO 2014/092141 discloses that a negative electrode active material (graphite), a carbon material (soft carbon), a conductive material (acetylene black), a thickener, and a binder are mixed to prepare a negative electrode paint.

SUMMARY

When a negative electrode paint is applied to a surface of a negative electrode current collector and dried, a negative electrode can be produced. In WO 2014/092141, a negative electrode active material and a carbon material are mixed. In WO 2014/092141, the negative electrode active material has a BET specific surface area of 0.5 m$^2$/g to 5 m$^2$/g and the carbon material has a BET specific surface area of 1 m$^2$/g to 7 m$^2$/g. In this manner, when a carbon material having a relatively large BET specific surface area is mixed into a negative electrode active material having a relatively small BET specific surface area, an improvement in a charging characteristic (that is, a reduction in DC resistance during charging) can be expected.

However, when the negative electrode paint is prepared, a binder can selectively adsorb to the carbon material having a large BET specific surface area. In general, the binder is a resistance component. When the binder is adsorbed to the carbon material, an effect of reducing DC resistance can be weaker.

According to the present disclosure, a reduction in DC resistance during charging is obtained.

The technical configuration and operations and effects of the present disclosure will be described below. However, the mechanism of action of the present disclosure includes assumptions. The scope of the claims should not be regarded as being limited according to the accuracy of the mechanism of action.

[1] A method of producing a negative electrode for a nonaqueous electrolyte secondary battery includes the following (a1) to (a4). (a1) A negative electrode active material, a first carbon material, a thickener, and a solvent are mixed to prepare a first dispersion solution. (a2) The first dispersion solution and a second carbon material are mixed to prepare a second dispersion solution. (a3) The second dispersion solution and a binder are mixed to prepare a negative electrode paint. (a4) The negative electrode paint is applied to a surface of a negative electrode current collector and dried to produce a negative electrode for a nonaqueous electrolyte secondary battery. The negative electrode active material has a BET specific surface area of 3 m$^2$/g or more and 8 m$^2$/g or less. The first carbon material has a BET specific surface area of 30 m$^2$/g or more and 100 m$^2$/g or less. The second carbon material has a BET specific surface area of 200 m$^2$/g or more and 500 m$^2$/g or less. When the mass of the negative electrode active material is represented as M, the mass of the first carbon material is represented as M1, and the mass of the second carbon material is represented as M2, M, M1 and M2 satisfy the following formulae (I) and (II):

$$M:M1=80:20 \text{ to } 95:5 \quad (I)$$

$$(M+M1):M2=100:0.5 \text{ to } 100:2 \quad (II)$$

In the production method in [1], two types of carbon materials are used. The first carbon material has a larger BET specific surface area than the negative electrode active material. The first carbon material is expected to contribute to reducing DC resistance during charging. The second carbon material has a larger BET specific surface area than the first carbon material. A used amount of the second carbon material is smaller than that of the first carbon material.

In the production method in [1], first, the negative electrode active material, the first carbon material, and the thickener are mixed. Thereby, the thickener is thought to be adsorbed to the first carbon material. Next, the second carbon material and the binder are sequentially mixed. Since the second carbon material is mixed in after the thickener is added, the thickener is thought to be unlikely to be adsorbed to the second carbon material.

When the binder is mixed in, the second carbon material to which the thickener is not adsorbed is thought to be present in the mixture. On the other hand, the thickener is thought to be adsorbed to the first carbon material. Therefore, the binder is thought to be selectively adsorbed to the second carbon material. That is, adsorption of the binder to the first carbon material is thought to be reduced. As described above, the thickener is adsorbed to the first carbon material. However, the thickener is thought to have lower resistance than the binder. Therefore, adsorption of the binder to the first carbon material is reduced, and thus a reduction in DC resistance during charging can be expected.

Here, the basis of the range of the BET specific surface area of each material and the like are shown in experiment results to be described below (Table 1). In addition, in this specification, "(M+M1)" indicates the total mass of the negative electrode active material and the first carbon material.

[2] The negative electrode active material may have a BET specific surface area of 3 m$^2$/g or more and 6 m$^2$/g or less. Thereby, a reduction in capacity retention rate during high temperature storage can be reduced.

[3] The first carbon material may have a BET specific surface area of 30 m$^2$/g or more and 70 m$^2$/g or less. Thereby, a reduction in capacity retention rate during high temperature storage can be reduced.

[4] The second carbon material may have a BET specific surface area of 200 m$^2$/g or more and 300 m$^2$/g or less. Thereby, a reduction in capacity retention rate during high temperature storage can be reduced.

[5] M and M1 may satisfy the following formula (III):

$$M:M1=90:10 \text{ to } 95:5 \quad (III)$$

Thereby, a reduction in capacity retention rate during high temperature storage can be reduced.

[6] M, M1, and M2 may satisfy the following formula (IV):

$$(M+M1):M2=100:0.5 \text{ to } 100:1 \quad \text{(IV)}$$

Thereby, a reduction in capacity retention rate during high temperature storage can be reduced.

[7] A method of producing a nonaqueous electrolyte secondary battery includes producing the negative electrode for a nonaqueous electrolyte secondary battery according to the method of producing a negative electrode for a nonaqueous electrolyte secondary battery according to any one of [1] to [6]. According to the method of producing a nonaqueous electrolyte secondary battery, it is possible to provide a nonaqueous electrolyte secondary battery with reduced DC resistance during charging.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
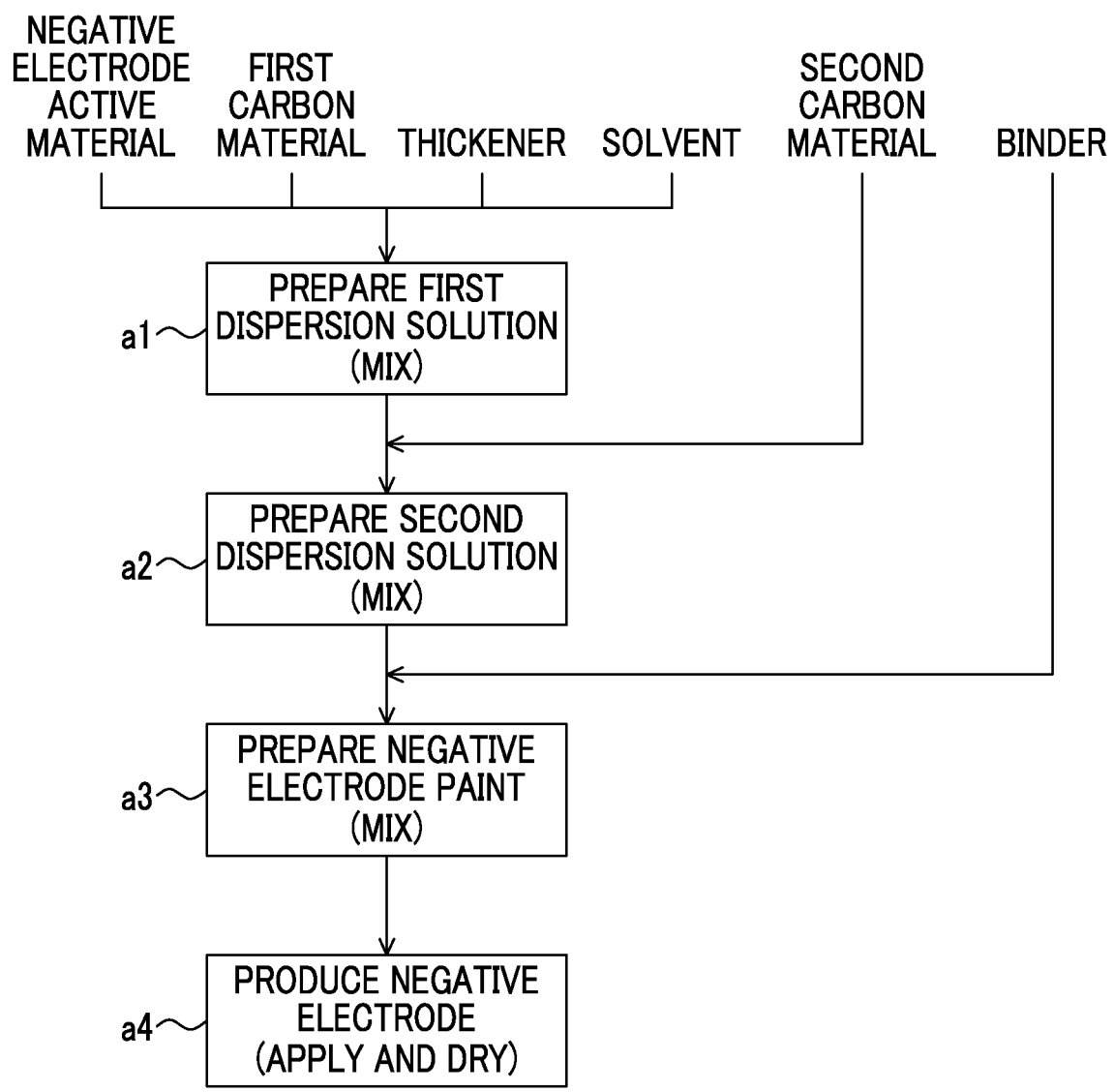
FIG. 1 is a flowchart showing an overview of a method of producing a negative electrode for a nonaqueous electrolyte secondary battery of the present embodiment.

Embodiments (referred to as "the present embodiment" in this specification) of the present disclosure will be described below. However, the following description does not limit the scope of the appended claims.

A lithium ion secondary battery will be described below as an example of a nonaqueous electrolyte secondary battery. However, the lithium ion secondary battery is only an example. The nonaqueous electrolyte secondary battery may be, for example, a sodium ion secondary battery.

In the drawings of the present disclosure, for convenience of explanation, the sizes are appropriately changed. The sizes in the drawings of the present disclosure do not reflect actual sizes.

A negative electrode for a nonaqueous electrolyte secondary battery will be referred to as a "negative electrode" and a nonaqueous electrolyte secondary battery will be referred to as a "battery" below in some cases.

<Method of Producing a Negative Electrode for a Nonaqueous Electrolyte Secondary Battery>

FIG. 1 is a flowchart showing an overview of a method of producing a negative electrode for a nonaqueous electrolyte secondary battery of the present embodiment. The method of producing a negative electrode of the present embodiment includes "(a1) preparing a first dispersion solution," "(a2) preparing a second dispersion solution," "(a3) preparing a negative electrode paint" and "(a4) producing a negative electrode." The method of producing a negative electrode of the present embodiment will be described below in that order.

<(a1) Preparing First Dispersion Solution>

The method of producing a negative electrode of the present embodiment includes preparing a first dispersion solution by mixing a negative electrode active material, a first carbon material, a thickener, and a solvent.

A general stirrer (for example, a planetary mixer or a homogenizer) may be used for a mixing operation of the present embodiment. The negative electrode active material, the first carbon material, the thickener, and the solvent are mixed at a predetermined mass ratio to prepare a first dispersion solution. When the first dispersion solution is prepared, the thickener is thought to be adsorbed to the negative electrode active material and the first carbon material.

(Negative Electrode Active Material)

The negative electrode active material electrochemically occludes and releases lithium ions (charge carriers). The negative electrode active material is an aggregate of particles (a powder). The negative electrode active material may be a carbon material that has undergone graphitization. The negative electrode active material may be, for example, graphite, easily graphitizable carbon, or non-graphitizable carbon. The graphite may be artificial graphite or natural graphite. The negative electrode active material may be a composite material of graphite and amorphous carbon. For example, the negative electrode active material may be a material in which the surface of natural graphite is covered with amorphous carbon (referred to as "amorphous coated natural graphite" in this specification).

The negative electrode active material has a BET specific surface area of 3 $m^2/g$ or more and 8 $m^2/g$ or less. The "BET specific surface area" in this specification is a value obtained by analyzing a nitrogen gas adsorption amount measured by a nitrogen adsorption method according to a BET multi-point method. For one powder sample, a BET specific surface area may be measured at least three times. An arithmetic mean of at least three measurements may be used as a measurement result.

The negative electrode active material may have a BET specific surface area of 3 $m^2/g$ or more and 6 $m^2/g$ or less. Accordingly, a reduction in capacity retention rate during high temperature storage can be reduced. The negative electrode active material may have a BET specific surface area of 3 $m^2/g$ or more and 4 $m^2/g$ or less. Therefore, both a charging characteristic (low DC resistance) and a high temperature storage characteristic (high capacity retention rate) can be expected.

The particle shape of the negative electrode active material is not particularly limited. The particle shape may be bulk, spherical, scaly, or the like. The negative electrode active material may have, for example, an average particle size of 1 μm to 30 μm. The "average particle size" in this specification refers to a particle size at which a cumulative volume from the side of fine particles is 50% of the total particle volume in a volume-based particle size distribution measured by a laser diffraction and scattering method.

(First Carbon Material)

The first carbon material is a powder. The first carbon material has high electron conductivity and contributes to reducing a DC resistance during charging. The first carbon material has a BET specific surface area of 30 $m^2/g$ or more and 100 $m^2/g$ or less. The first carbon material is not particularly limited as long as it is substantially composed of carbon and has a BET specific surface area of 30 $m^2/g$ or more and 100 m²/g or less. The first carbon material may be, for example, carbon black such as acetylene black, thermal black, furnace black, and channel black. The first carbon material may be graphitized carbon black (carbon black that has been graphitized). The first carbon material may be obtained by pulverizing, for example, natural graphite, artificial graphite, easily graphitizable carbon, or non-graphitizable carbon.

The first carbon material may have a BET specific surface area of 30 m²/g or more and 70 m²/g or less. Thereby, a reduction in capacity retention rate during high temperature storage can be reduced. The first carbon material may have a BET specific surface area of 30 m²/g or more and 50 m²/g or less. Thereby, both a charging characteristic and a high temperature storage characteristic can be expected.

The first carbon material may have, for example, a primary particle size of 20 nm or more and 80 nm or less. Thereby, a reduction in DC resistance can be expected. "Primary particle size" in this specification refers to an arithmetic mean of particle sizes (Feret size) measured in an electron microscope image. The arithmetic mean may be calculated from at least 100 particles. The first carbon material may have, for example, a primary particle size of 40 nm or more and 60 nm or less.

(Thickener)

The thickener imparts viscosity to a dispersion solution and a paint, and increases the dispersion stability of the dispersoid. It is desirable that the thickener of the present embodiment be soluble in a solvent. The thickener may be, for example, carboxymethylcellulose (CMC), alginic acid, hydroxypropyl methylcellulose (HPMC), polyethylene oxide (PEO), polyacrylic acid (PAA), or a polysaccharide thickener. One type of thickener may be used alone or two or more types of thickeners may be used in combination.

The thickener may be added in a proportion of, for example, 0.1 mass % to 3 mass % (typically, 0.5 mass % to 1.5 mass %) with respect to the total amount of the negative electrode active material, the first carbon material, and a second carbon material (to be described below).

(Solvent)

The solvent is selected according to the type of thickener and binder (to be described below). The solvent may be, for example, water or an organic solvent. For example, when the thickener is CMC, water may be used as the solvent. The solvent may be an organic solvent miscible with water or a mixture with water (an aqueous solvent). Examples of the organic solvent miscible with water include ethanol, isopropyl alcohol, acetone, and tetrahydrofuran. The solvent may be added so that, for example, the first dispersion solution has a solid content proportion of about 54 mass % to 65 mass %. The "solid content proportion" in this specification refers to a mass proportion of components other than the solvent.

<(a2) Preparing Second Dispersion Solution>

The method of producing a negative electrode of the present embodiment includes preparing a second dispersion solution by mixing the first dispersion solution and the second carbon material.

The second dispersion solution may be prepared using a general stirrer like the first dispersion solution. In the present embodiment, the second carbon material is added after the thickener is added. Thus, the thickener is thought to be unlikely to adsorb to the second carbon material. In addition, when the second carbon material and the first carbon material are gradually added, it is possible to reduce aggregating of the second carbon material and the first carbon material. Thereby, a stronger effect of reducing the DC resistance during charging can be expected.

(Second Carbon Material)

The second carbon material is a powder. The second carbon material has a large BET specific surface area and adsorbs the binder. The second carbon material has a BET specific surface area of 200 m²/g or more and 500 m²/g or less. The second carbon material is not particularly limited as long as it is substantially composed of carbon and has a BET specific surface area of 200 m²/g or more and 500 m²/g or less. The second carbon material may be obtained by pulverizing, for example, carbon black, graphitized carbon black, or natural graphite, like the above first carbon material.

The second carbon material may have a BET specific surface area of 200 m²/g or more and 300 m²/g or less. Thereby, a reduction in capacity retention rate during high temperature storage can be reduced. The second carbon material may have a BET specific surface area of 200 m²/g or more and 250 m²/g or less. Thereby, both a charging characteristic and a high temperature storage characteristic can be expected The second carbon material may have, for example, a smaller primary particle size than the first carbon material. Thereby, the binder can be expected to easily be selectively adsorbed to the second carbon material. The second carbon material may have, for example, a primary particle size of 10 nm or more and 20 nm or less.

(Mass Ratio Between Negative Electrode Active Material, First Carbon Material, and Second Carbon Material)

In the present embodiment, the negative electrode active material, the first carbon material and the second carbon material have a specific mass ratio. That is, when the mass of the negative electrode active material is represented as M, the mass of the first carbon material is represented as M1, and the mass of the second carbon material is represented as M2, M, M1 and M2 satisfy the following formulae (I) and (II):

$$M:M1=80:20 \text{ to } 95:5 \tag{I}$$

$$(M+M1):M2=100:0.5 \text{ to } 100:2 \tag{II}$$

Thereby, a reduction in DC resistance during charging can be expected.

M and M1 may satisfy the following formula (III):

$$M:M1=90:10 \text{ to } 95:5 \tag{III}.$$

Thereby, a reduction in capacity retention rate during high temperature storage can be reduced.

M, M1, and M2 may satisfy the following formula (IV):

$$(M+M1):M2=100:0.5 \text{ to } 100:1 \tag{IV}$$

Thereby, a reduction in capacity retention rate during high temperature storage can be reduced.

<(a3) Preparing Negative Electrode Paint>

The method of producing a negative electrode of the present embodiment includes preparing a negative electrode paint by mixing the second dispersion solution and the binder.

The negative electrode paint may be prepared using a general stirrer like the first dispersion solution and the second dispersion solution. In the present embodiment, the binder is thought to be selectively adsorbed to the second carbon material. This is because the thickener has already been adsorbed to the first carbon material and there is a second carbon material to which no thickener is adsorbed.

(Binder)

The binder binds solid materials (such as negative electrode active materials) to each other and binds the solid material and a negative electrode current collector (to be described below). The binder may be, for example, styrene-butadiene rubber (SBR), an acrylic acid-acrylic acid ester copolymer, an ethylene-acrylic acid ester copolymer, or a styrene-acrylic acid ester copolymer. One type of binder may be used alone or two or more types of binders may be used in combination.

The binder may be added in a proportion of, for example, 0.1 mass % to 3 mass % (typically, 0.5 mass % to 1.5 mass %), with respect to the total amount of the negative electrode active material, the first carbon material, and the second carbon material.

Here, in order to adjust a solid content proportion of the negative electrode paint, the solvent may be added. The negative electrode paint may be prepared so that it ultimately has, for example, a solid content proportion of 40 mass % to 60 mass %.

<(a4) Producing Negative Electrode>

The method of producing a negative electrode of the present embodiment includes producing a negative electrode by applying the negative electrode paint to the surface of the negative electrode current collector and drying the negative electrode paint.

A general coating device (for example, a die coater or a gravure coater) may be used for a coating operation of the present embodiment. The negative electrode current collector may be, for example, a copper (Cu) foil. The Cu foil may be a pure Cu foil or a Cu alloy foil. The negative electrode current collector may have, for example, a thickness of 5 μm to 30 μm.

The "thickness" of each component in this specification may be measured by, for example, a micrometer. The thickness of each component may be measured in a sectional microscope image of each component. The thickness may be measured at least three times. An arithmetic mean of the at least three measurements may be used as a measurement result.

When the negative electrode paint is applied to the surface of the negative electrode current collector and dried, a negative electrode active material layer may be formed on the surface of the negative electrode current collector. The negative electrode active material layer may be formed on both front and rear surfaces of the negative electrode current collector. In the present embodiment, the negative electrode active material layer may be compressed so that the negative electrode active material layer has a predetermined density. For example, a rolling mill may be used for a compression operation. In the present embodiment, the negative electrode active material layer may be compressed so that the negative electrode active material layer has, for example, a density of 1 g/cm$^3$ to 2 g/cm$^3$. The compressed negative electrode active material layer may have, for example, a thickness of 10 μm to 200 μm.

Accordingly, a negative electrode can be produced. The negative electrode may be cut into a predetermined planar shape (for example, a belt-like shape) according to the specification of the battery and then used.

<Method of Producing Nonaqueous Electrolyte Secondary Battery>

Figure 2:
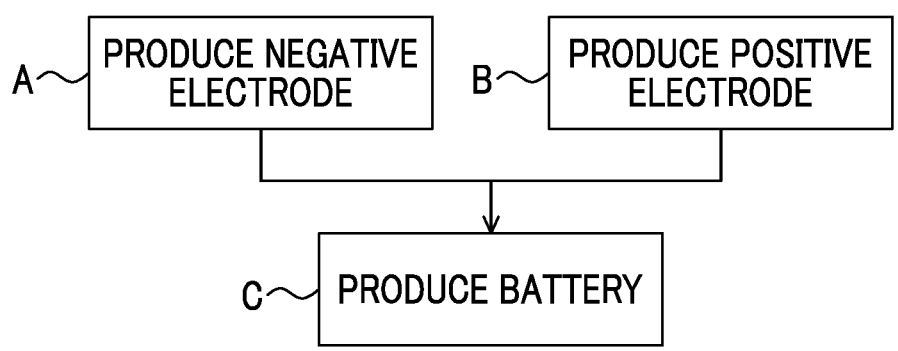
FIG. 2 is a flowchart showing an overview of a method of producing a nonaqueous electrolyte secondary battery of the present embodiment.

FIG. 2 is a flowchart showing an overview of a method of producing a nonaqueous electrolyte secondary battery of the present embodiment. The method of producing a battery of the present embodiment includes "(A) producing a negative electrode," "(B) producing a positive electrode" and "(C) producing a battery." The method of producing a battery of the present embodiment will be described below in that order.

<(A) Producing Negative Electrode>

The method of producing a battery of the present embodiment includes producing a negative electrode according to the method of producing a negative electrode of the present embodiment described above. Details of the method of producing a negative electrode of the present embodiment are as above. The same descriptions will not be repeated here.

<(B) Producing Positive Electrode>

The method of producing a battery of the present embodiment includes producing a positive electrode. A method of producing a positive electrode is not particularly limited. The positive electrode may be produced by a known method in the related art.

For example, a positive electrode active material, a conductive material, a binder, and a solvent are mixed to prepare a positive electrode paint. When the positive electrode paint is applied to the surface of the positive electrode current collector and dried, a positive electrode may be produced. The positive electrode may be cut into a predetermined planar shape according to the specification of the battery and then used.

The positive electrode current collector may be, for example, an aluminum (Al) foil. The Al foil may be a pure Al foil or an Al alloy foil. The Al foil may have, for example, a thickness of 10 μm to 30 μm.

When the positive electrode paint is applied to the surface of the positive electrode current collector and dried, a positive electrode active material layer may be formed. The positive electrode active material layer may be formed on both front and rear surfaces of the positive electrode current collector. In the present embodiment, the positive electrode active material layer may be compressed so that the positive electrode active material layer has a predetermined density. In the present embodiment, the positive electrode active material layer may be compressed so that the positive electrode active material layer has, for example, a density of 2 g/cm$^3$ to 4 g/cm$^3$. The compressed positive electrode active material layer may have, for example, a thickness of 10 μm to 200 μm. The positive electrode active material layer may be formed to include, for example, the positive electrode active material at 80 mass % to 98 mass %, the conductive material at 1 mass % to 15 mass %, and the binder at 1 mass % to 5 mass %.

(Positive Electrode Active Material)

The positive electrode active material electrochemically occludes and releases lithium ions. The positive electrode active material is a powder. The positive electrode active material is not particularly limited. The positive electrode active material may be, for example, LiCoO$_2$, LiNiO$_2$, LiMnO$_2$, LiNi$_x$Co$_y$Me$_z$O$_2$ (here, in the formula, Me is at least one of Mn and Al, and x, y, and z satisfy 0<x<1, 0<y<1, 0<z<1, and x+y+z=1), LiMn$_2$O$_4$, or LiFePO$_4$. As the positive electrode active material represented by the general formula: LiNi$_x$Co$_y$Me$_z$O$_2$, for example, LiNi$_{1/3}$Co$_{1/3}$Mn$_{1/3}$O$_2$, and LiNi$_{0.82}$Co$_{0.15}$Al$_{0.03}$O$_2$ may be exemplified. One type of positive electrode active material may be used alone or two or more types of positive electrode active materials may be used in combination. The positive electrode active material may have, for example, an average particle size of 1 μm to 30 μm.

(Conductive Material)

The conductive material has electron conductivity. The conductive material is a powder. The conductive material is not particularly limited. The conductive material may be, for example, carbon black or scaly graphite. One type of conductive material may be used alone or two or more types of conductive materials may be used in combination.

(Binder)

The binder is not particularly limited. The binder may be, for example, polyvinylidene fluoride (PVdF), a vinylidene fluoride-hexafluoropropylene copolymer (PVdF-HFP), polytetrafluoroethylene (PTFE), CMC, or PAA. One type of binder may be used alone or two or more types of binders may be used in combination.

(Solvent)

The solvent is appropriately selected according to the type of binder. For example, when the binder is PVdF, N-methyl-2-pyrrolidone (NMP) may be used as the solvent.

<(C) Producing Battery>

The method of producing a battery of the present embodiment includes producing a battery including at least a positive electrode, a negative electrode and a nonaqueous electrolyte.

Figure 3:
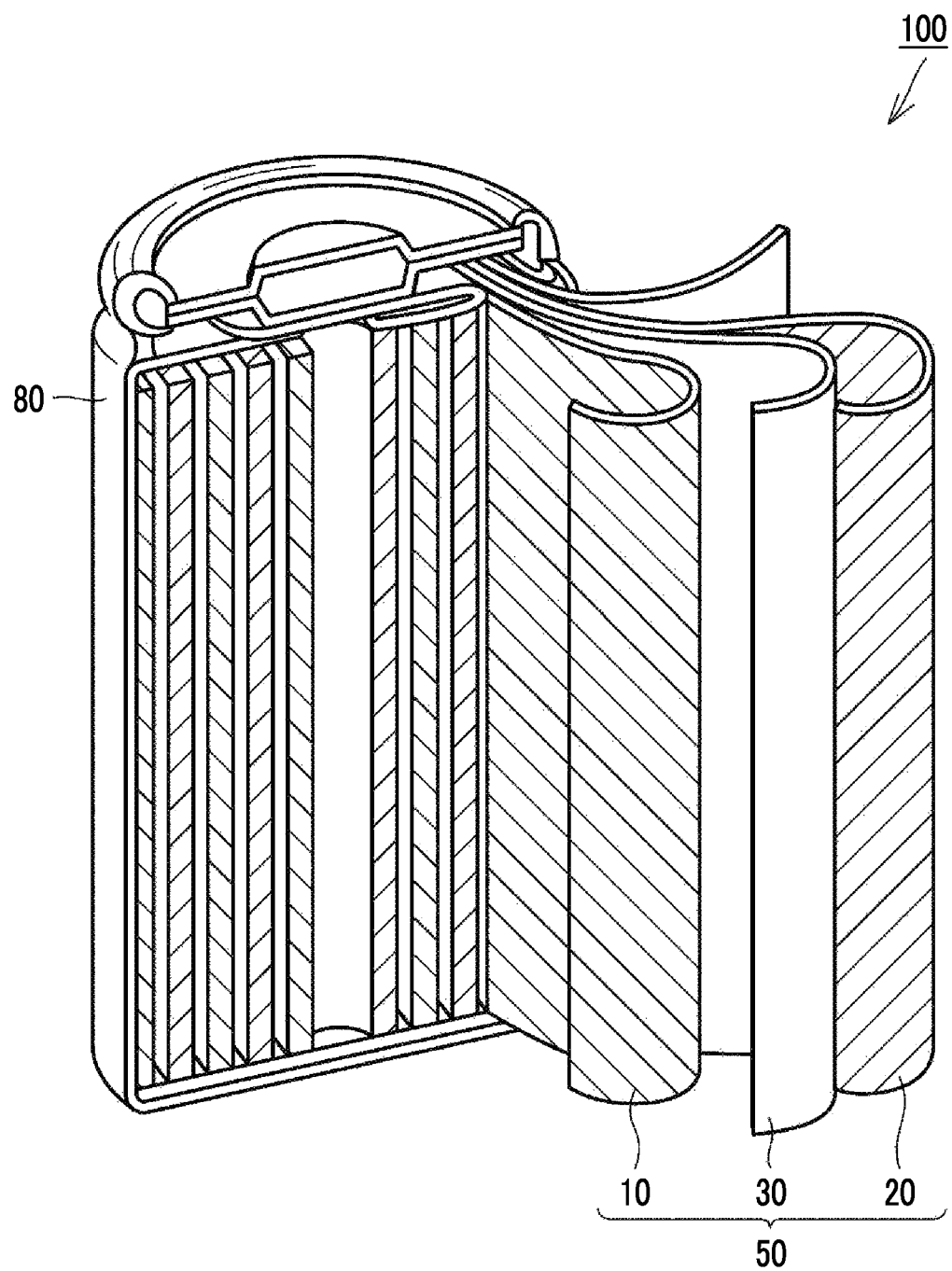
FIG. 3 is a schematic diagram showing an example of a configuration of the nonaqueous electrolyte secondary battery of the present embodiment.

FIG. 3 is a schematic diagram showing an example of a configuration of a nonaqueous electrolyte secondary battery of the present embodiment. Here, an electrode group 50 is produced. The electrode group 50 may be produced by, for example, laminating a positive electrode 10, a separator 30, a negative electrode 20, and a separator 30 in that order and additionally winding them into a spiral shape.

The separator 30 is a porous sheet. The separator 30 has an electrically insulating property. The separator 30 may have, for example, a thickness of 5 μm to 50 μm (typically 10 μm to 25 μm). The separator 30 may be made of, for example, polyethylene (PE) or polypropylene (PP). The separator 30 may have a multi-layer structure. For example, the separator 30 may be obtained by laminating a polypropylene porous layer, a polyethylene porous layer and a polypropylene porous layer in that order.

A case 80 is prepared. The case 80 is a sealed container. The case 80 may be made of a metal, for example, an Al alloy, stainless steel (SUS), or iron (Fe). The case 80 may be made of a resin. The case 80 may be, for example, a bag made of an aluminum laminate film. The case 80 may include a current interrupt device (CID), a gas exhaust valve, an injection hole, and the like.

The case 80 has a cylindrical shape. However, the nonaqueous electrolyte secondary battery of the present embodiment is not limited to a cylindrical battery. The nonaqueous electrolyte secondary battery of the present embodiment may be, for example, a rectangular battery or a laminate type battery.

The electrode group 50 is accommodated in the case 80. The positive electrode 10 and the negative electrode 20 are welded to parts that will become external terminals.

(Nonaqueous Electrolyte)

The nonaqueous electrolyte is prepared. The nonaqueous electrolyte of the present embodiment may typically be a liquid electrolyte (electrolyte solution). The nonaqueous electrolyte of the present embodiment may be a gel electrolyte or the like.

The electrolyte solution contains a solvent and a supporting electrolyte. The electrolyte solution may contain, for example, the supporting electrolyte at 0.5 mol/l to 2 mol/l. The supporting electrolyte may be, for example, a lithium salt. The lithium salt may be $LiPF_6$, $LiBF_4$, $Li[N(FSO_2)_2]$, $Li[N(CF_3SO_2)_2]$, or the like. One type of supporting electrolyte may be used alone or two or more types of supporting electrolytes may be used in combination.

The solvent is aprotic. The solvent may be, for example, a solvent in which a cyclic carbonate and a chain carbonate are mixed. The mixing ratio may be, for example, "cyclic carbonate:chain carbonate=1:9 to 5:5" by volume ratio. As the cyclic carbonate, for example, ethylene carbonate (EC), propylene carbonate (PC), butylene carbonate (BC), and fluoroethylene carbonate (FEC) may be exemplified. As the chain carbonate, dimethyl carbonate (DMC), ethyl methyl carbonate (EMC), and diethyl carbonate (DEC) may be exemplified. One type of each of the cyclic carbonate and the chain carbonate may be used alone, or two or more types thereof may be used in combination.

The solvent may contain, for example, a lactone, a cyclic ether, a chain ether, and a carboxylic ester. As the lactone, for example, γ-butyrolactone (GBL) and δ-valerolactone may be exemplified. As the cyclic ether, for example, tetrahydrofuran (THF), 1,3-dioxolane, and 1,4-dioxane may be exemplified. As the chain ether, 1,2-dimethoxyethane (DME) and the like may be exemplified. As the carboxylic ester, for example, methyl formate (MF), methyl acetate (MA), and methyl propionate (MP) may be exemplified.

The electrolyte solution may include various functional additives in addition to the solvent and the supporting electrolyte. The electrolyte solution may include, for example, a functional additive at 1 mass % to 5 mass %. As the functional additive, for example, a gas generating agent (overcharge additive), and a film forming agent may be exemplified. As the gas generating agent, for example, cyclohexylbenzene (CHB) and biphenyl (BP) may be exemplified. As the film forming agent, for example, vinylene carbonate (VC), vinylethylene carbonate (VEC), $Li[B(C_2O_4)_2]$, $LiPO_2F_2$, propane sultone (PS), and ethylene sulfite (ES) may be exemplified.

The nonaqueous electrolyte is accommodated in (injected into) the case 80. The nonaqueous electrolyte is accommodated and the case 80 is then sealed. Thereby, a battery 100 can be produced.

<Applications and the Like>

The nonaqueous electrolyte secondary battery of the present embodiment is expected to exhibit low DC resistance during charging. The nonaqueous electrolyte secondary battery of the present embodiment is expected to exhibit low DC resistance during charging, particularly, in a low temperature environment. The nonaqueous electrolyte secondary battery of the present embodiment is suitable for applications for storing instantaneous regenerative electric power. Examples of such applications include power batteries of a hybrid vehicle (HV), a plug-in hybrid vehicle (PHV), and an electric vehicle (EV). However, the application of the nonaqueous electrolyte secondary battery of the present embodiment is not limited to power for vehicles. The nonaqueous electrolyte secondary battery of the present embodiment can be used for all applications.

Examples of the present disclosure will be described below. However, the following examples do not limit the scope of the claims. In this specification, for example, a production example in which No. is marked with "*" such as "No. *1" is a comparative example. For example, a production example in which No. is not marked with "*" such as "No. 2" is an example.

<No. *1>

In No. *1, a negative electrode was produced according to the flowchart in FIG. 1. Here, the flowchart in FIG. 1 shows an overview of the method of producing a negative electrode of the present embodiment. However, in No. *1, since the BET specific surface area of the first carbon material was less than 30 m²/g, No. *1 was a comparative example.

<(A) Producing Negative Electrode>

The following materials were prepared.

Negative electrode active material: amorphous coated natural graphite (BET specific surface area: 4 $m^2/g$), first carbon material: carbon black (BET specific surface area: 20 $m^2/g$), second carbon material: carbon black (BET specific surface area: 250 $m^2/g$), thickener: CMC, binder: SBR, solvent: water, and negative electrode current collector: Cu foil <(a1) Preparing First Dispersion Solution>

The negative electrode active material, the first carbon material, the thickener, and the solvent were mixed to prepare a first dispersion solution. A mass ratio (M:M1) between the negative electrode active material and the first carbon material is shown in the following Table 1. An amount of thickener added was 1 mass % with respect to the total amount of the negative electrode active material, the first carbon material, and the second carbon material.

<(a2) Preparing Second Dispersion Solution>

The first dispersion solution and the second carbon material were mixed to prepare a second dispersion solution. A mass ratio [(M+M1):M2] between the total amount of the negative electrode active material and the first carbon material and the second carbon material is shown in the following Table 1.

<(a3) Preparing Negative Electrode Paint>

The second dispersion solution and the binder were mixed to prepare a negative electrode paint. An amount of binder added was 1 mass % with respect to the total amount of the negative electrode active material, the first carbon material, and the second carbon material.

<(a4) Producing Negative Electrode>

The negative electrode paint was applied to the surface of the negative electrode current collector and dried. Thereby, a negative electrode was produced. The negative electrode (negative electrode active material layer) was compressed. The negative electrode had a belt-like planar shape.

<(B) Producing Positive Electrode>

The following materials were prepared.

Positive electrode active material: $LiNi_{1/3}Co_{1/3}Mn_{1/3}O_2$, conductive material: acetylene black, binder: PVdF, solvent: NMP, and positive electrode current collector: Al foil The positive electrode active material, the conductive material, the binder, and the solvent were mixed to prepare a positive electrode paint. A mass ratio between the positive electrode active material, the conductive material, and the binder was "positive electrode active material:conductive material:binder=90:8:2." The positive electrode paint was applied to the surface of the positive electrode current collector and dried. Thereby, a positive electrode was produced. The positive electrode (positive electrode active material layer) was compressed. The positive electrode had a belt-like planar shape.

A separator made of polyethylene was prepared. The separator had a belt-like planar shape. The positive electrode, the separator, the negative electrode, and the separator were laminated in that order and were additionally wound in a spiral shape. Thereby, an electrode group was produced.

A cylindrical case was prepared. The case had an 18650 size (diameter: 18 mm, height: 65 mm). The electrode group was accommodated in the case.

A nonaqueous electrolyte (electrolyte solution) including the following components was prepared.

Solvent: [EC:DMC:EMC=3:4:3 (volume ratio)], and supporting electrolyte: $LiPF_6$ (1 mol/l)

The electrolyte solution was injected into the case. The case was sealed. Thereby, a nonaqueous electrolyte secondary battery (cylindrical lithium ion secondary battery) was produced. The battery had a rated capacity of 500 mAh.

<Nos. 2 to 5>

Negative electrodes were produced in the same manner as in No. *1 except that the first carbon material having a BET specific surface area in the following Table 1 was used and batteries were produced.

<Nos. *6 to 10>

Negative electrodes were produced in the same manner as in No. 3 except that the second carbon material having a BET specific surface area in the following Table 1 was used and batteries were produced. Here, in the following Table 1, Nos. 8, 13, 18, and 21 indicate the same production example as No. 3 although No. is changed for convenience of explanation. In the following Table 1, the same production example as No. 3 is denoted as, for example, "8(3)."

<Nos. *11 to 15>

Negative electrodes were produced in the same manner as in No. 3 except that the negative electrode active material having a BET specific surface area in the following Table 1 was used and batteries were produced.

<Nos. 16 to *19>

Negative electrodes were produced in the same manner as in No. 3 except that the mass ratio between the negative electrode active material and the first carbon material was changed as shown in the following Table 1, and batteries were produced.

<Nos. *20 to 23>

Negative electrodes were produced in the same manner as in No. 3 except that a mass ratio between the total amount of the negative electrode active material and the first carbon material and the second carbon material was changed as shown in the following Table 1, and batteries were produced.

<No. *24>

Figure 4:
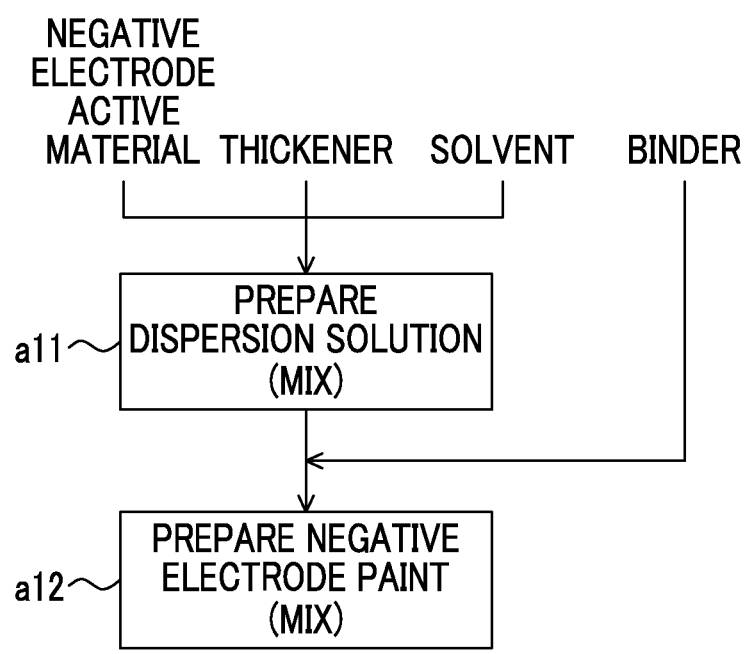
FIG. 4 is a flowchart showing an overview of a method of producing a negative electrode paint of No. *24.

FIG. 4 is a flowchart showing an overview of a method of producing a negative electrode paint of No. *24. The negative electrode active material, the thickener, and the solvent were mixed. Thereby, a dispersion solution was prepared (a11). Next, the binder was added to the dispersion solution, and the dispersion solution was additionally mixed. Thereby, a negative electrode paint was prepared (a12). Except for these procedures, a negative electrode was produced in the same manner as in No. *1 and a battery was produced. No. *24 was a comparative example in which the first carbon material and the second carbon material were not used.

<No. *25>

Figure 5:
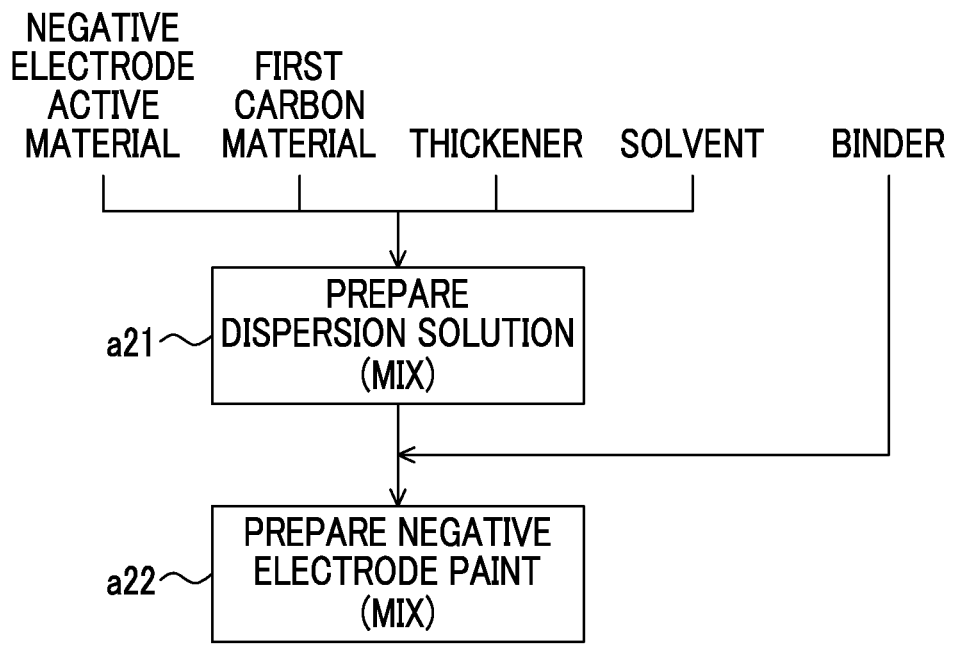
FIG. 5 is a flowchart showing an overview of a method of producing a negative electrode paint of No. *25.

FIG. 5 is a flowchart showing an overview of a method of producing a negative electrode paint of No. *25. The negative electrode active material, the first carbon material, the thickener, and the solvent were mixed. Thereby, a dispersion solution was prepared (a21). The binder was added to the dispersion solution, and the dispersion solution was additionally mixed. Thereby, a negative electrode paint was prepared (a22). Except for these procedures, a negative electrode was produced in the same manner as in No. *1, and a battery was produced. No. *25 was a comparative example in which the second carbon material was not used.

<No. *26>

Figure 6:
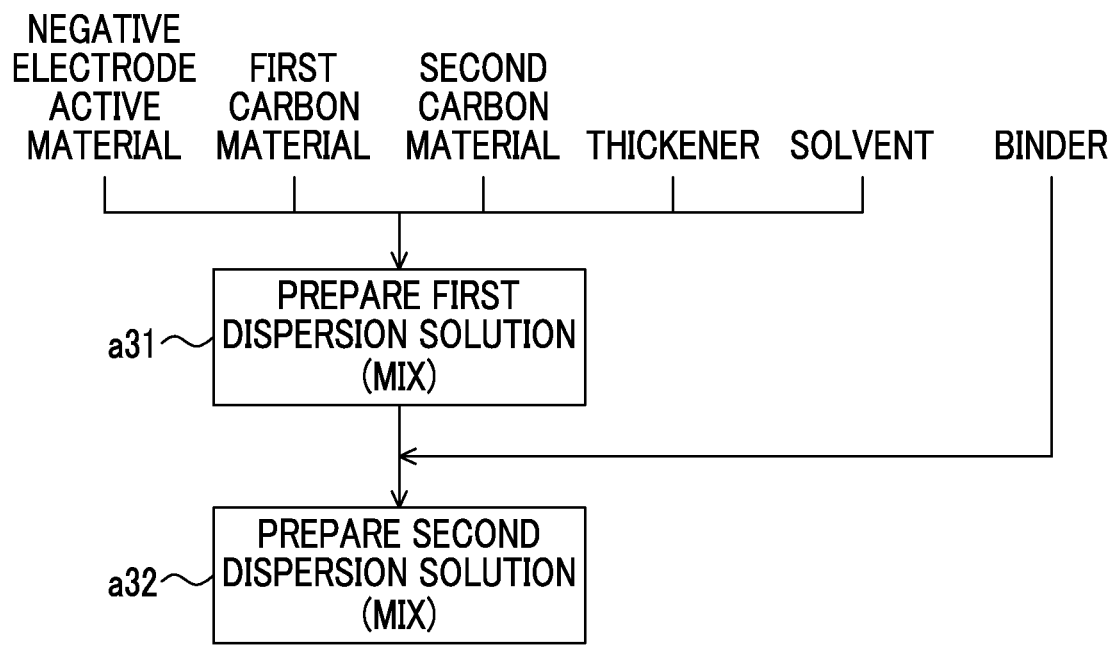
FIG. 6 is a flowchart showing an overview of a method of producing a negative electrode paint of No. *26.

FIG. 6 is a flowchart showing an overview of a method of producing a negative electrode paint of No. *26. The negative electrode active material, the first carbon material, the second carbon material, the thickener, and the solvent were mixed. Thereby, a dispersion solution was prepared (a31). The binder was added to the dispersion solution and the dispersion solution was additionally mixed. Thereby, a negative electrode paint was prepared (a32). Except for these procedures, a negative electrode was produced in the same manner as in No. *1 and a battery was produced. No. *26 was a comparative example in which the negative electrode active material, the first carbon material, and the second carbon material were mixed at once.

<Evaluation>

1. Measurement of Initial Capacity

In a 25° C. environment, the battery was fully charged according to constant current and constant voltage charging (current during constant current charging=350 mA, voltage during constant voltage charging=4.1 V, total charging time=2 hours). Next, the battery was discharged to 3.0 V with a current of 150 mA. A discharging capacity at this time was set as an initial capacity.

absolute value thereof increases, the DC resistance during charging is reduced.

3. High Temperature Storage Characteristic

An SOC of the battery was adjusted to 90%. The battery was disposed in the thermostatic tank set at 60° C. The battery was stored in the thermostatic tank for 60 days. After 60 days, in a 25° C. environment, a discharging capacity (capacity after storage) was measured in the same conditions as in the initial capacity. A capacity retention rate was calculated by dividing the capacity after storage by the initial capacity. The results are shown in the following Table 1.

TABLE 1

| No. | BET specific surface area [m²/g] | | | Mass ratio (M:M1:M2) | | | M:M1 = 80:20 to 95:5 | (M + M1):M2 = 100:0.5 to 100:2 | Production flow | Charging characteristic | | High temperature storage characteristic Capacity retention rate [%] |
|---|---|---|---|---|---|---|---|---|---|---|---|---|
| | Negative electrode active material | First carbon material | Second carbon material | Negative electrode active material | First carbon material | Second carbon material | | | | Resistance [mΩ] | Reduction rate [%] | |
| *1 | 4 | 20 | 250 | 95 | 5 | 0.5 | 95:5 | 100:0.5 | FIG. 1 | 54.0 | −1.8 | 77.7 |
| 2 | 4 | 30 | 250 | 95 | 5 | 0.5 | 95:5 | 100:0.5 | FIG. 1 | 51.0 | −7.3 | 77.5 |
| 3 | 4 | 50 | 250 | 95 | 5 | 0.5 | 95:5 | 100:0.5 | FIG. 1 | 50.3 | −8.5 | 77.5 |
| 4 | 4 | 70 | 250 | 95 | 5 | 0.5 | 95:5 | 100:0.5 | FIG. 1 | 50.0 | −9.1 | 75.9 |
| 5 | 4 | 100 | 250 | 95 | 5 | 0.5 | 95:5 | 100:0.5 | FIG. 1 | 49.9 | −9.3 | 74.0 |
| *6 | 4 | 50 | 100 | 95 | 5 | 0.5 | 95:5 | 100:0.5 | FIG. 1 | 53.9 | −2.0 | 77.8 |
| 7 | 4 | 50 | 200 | 95 | 5 | 0.5 | 95:5 | 100:0.5 | FIG. 1 | 50.5 | −8.2 | 77.6 |
| 8(3) | 4 | 50 | 250 | 95 | 5 | 0.5 | 95:5 | 100:0.5 | FIG. 1 | 50.3 | −8.5 | 77.5 |
| 9 | 4 | 50 | 300 | 95 | 5 | 0.5 | 95:5 | 100:0.5 | FIG. 1 | 50.1 | −8.9 | 77.1 |
| 10 | 4 | 50 | 500 | 95 | 5 | 0.5 | 95:5 | 100:0.5 | FIG. 1 | 50.1 | −8.9 | 75.0 |
| *11 | 1 | 50 | 250 | 95 | 5 | 0.5 | 95:5 | 100:0.5 | FIG. 1 | 58.0 | +5.5 | 81.0 |
| 12 | 3 | 50 | 250 | 95 | 5 | 0.5 | 95:5 | 100:0.5 | FIG. 1 | 51.5 | −6.4 | 79.0 |
| 13(3) | 4 | 50 | 250 | 95 | 5 | 0.5 | 95:5 | 100:0.5 | FIG. 1 | 50.3 | −8.5 | 77.5 |
| 14 | 6 | 50 | 250 | 95 | 5 | 0.5 | 95:5 | 100:0.5 | FIG. 1 | 49.6 | −9.8 | 76.0 |
| 15 | 8 | 50 | 250 | 95 | 5 | 0.5 | 95:5 | 100:0.5 | FIG. 1 | 48.5 | −11.8 | 74.5 |
| 16 | 4 | 50 | 250 | 80 | 20 | 0.5 | 80:20 | 100:0.5 | FIG. 1 | 48.6 | −11.6 | 74.5 |
| 17 | 4 | 50 | 250 | 90 | 10 | 0.5 | 90:10 | 100:0.5 | FIG. 1 | 49.9 | −9.3 | 76.0 |
| 18(3) | 4 | 50 | 250 | 95 | 5 | 0.5 | 95:5 | 100:0.5 | FIG. 1 | 50.3 | −8.5 | 77.5 |
| *19 | 4 | 50 | 250 | 98 | 2 | 0.5 | 98:2 | 100:0.5 | FIG. 1 | 54.0 | −1.8 | 78.0 |
| *20 | 4 | 50 | 250 | 95 | 5 | 0.2 | 95:5 | 100:0.2 | FIG. 1 | 53.9 | −2.0 | 78.0 |
| 21(3) | 4 | 50 | 250 | 95 | 5 | 0.5 | 95:5 | 100:0.5 | FIG. 1 | 50.3 | −8.5 | 77.5 |
| 22 | 4 | 50 | 250 | 95 | 5 | 1 | 95:5 | 100:1 | FIG. 1 | 50.3 | −8.5 | 77.0 |
| 23 | 4 | 50 | 250 | 95 | 5 | 2 | 95:5 | 100:2 | FIG. 1 | 50.3 | −8.5 | 75.0 |
| *24 | 4 | — | — | 100 | 0 | 0 | 100:0 | 100:0 | FIG. 4 | 55.0 | Reference value | 78.0 |
| *25 | 4 | 50 | — | 95 | 5 | 0 | 95:5 | 100:0 | FIG. 5 | 52.3 | −4.9 | 76.8 |
| *26 | 4 | 50 | 250 | 95 | 5 | 0.5 | 95:5 | 100:0.5 | FIG. 6 | 52.3 | −4.9 | 76.6 |

2. Charging Characteristic

A state of charge (SOC) of the battery was adjusted to 50%. The battery was disposed in a thermostatic tank set at −10° C. The battery was charged for 10 seconds with a current of 150 mA. An amount of increase in voltage after 10 seconds was measured. Similarly, a charging current was changed to 500 mA, 1000 mA, and 1500 mA, and an amount of increase in voltage from an SOC of 50% was measured at each charging current. The results were plotted as two-dimensional coordinates in which the horizontal axis represents a charging current and the vertical axis represents an amount of increase in voltage. An inclination of a straight line connecting points was set as DC resistance. The results are shown in the following Table 1.

In the following Table 1, the DC resistance and a reduction rate thereof are shown. The reduction rate is a reduction rate when the DC resistance of No. *24 is set as a reference value. As the reduction rate is a negative value and an <Results>

As shown in the above Table 1, it was observed that the production examples (for example, No. 3) that satisfied the following conditions tended to have a larger reduction rate of DC resistance than the production examples that did not satisfy the same conditions (for example, No. *1). The negative electrode active material had a BET specific surface area of 3 m²/g or more and 8 m²/g or less. The first carbon material had a BET specific surface area of 30 m²/g or more and 100 m²/g or less. The second carbon material had a BET specific surface area of 200 m²/g or more and 500 m²/g or less. M, M1, and M2 satisfied the following formulae (I) and (II).

$$M:M1=80:20 \text{ to } 95:5 \quad (I)$$

$$(M+M1):M2=100:0.5 \text{ to } 100:2 \quad (II)$$

No. *26 had the same mass ratio as No. 3. However, the reduction rate of DC resistance was not sufficient. This is thought to have been caused by the fact that, in the production flow (FIG. 6) of No. *26, the binder was also adsorbed to the first carbon material.

In No. *25, a reduction rate of DC resistance was not sufficient. This is thought to have been caused by the fact that, since the second carbon material was not used, the binder was adsorbed to the first carbon material.

Based on results of Nos. 2 to 5, it was observed that, when the first carbon material had a BET specific surface area of 30 m²/g or more and 70 m²/g or less, a reduction in capacity retention rate during high temperature storage tended to be reduced. When an increase in BET specific surface area of the negative electrode was reduced, a side reaction between the electrolyte solution and the negative electrode was thought to be reduced.

Based on results of Nos. 7 to 10, it was observed that, when the second carbon material had a BET specific surface area of 200 m²/g or more and 300 m²/g or less, a reduction in capacity retention rate during high temperature storage tended to be reduced. When an increase in BET specific surface area of the negative electrode was reduced, a side reaction between the electrolyte solution and the negative electrode was thought to be reduced.

Based on results of Nos. 12 to 15, it was observed that, when the negative electrode active material had a BET specific surface area of 3 m²/g or more and 6 m²/g or less, a reduction in capacity retention rate during high temperature storage tended to be reduced. When an increase in BET specific surface area of the negative electrode was reduced, a side reaction between the electrolyte solution and the negative electrode was thought to be reduced.

Based on results of Nos. 16 to 18, it was observed that, when M and M1 additionally satisfied the following formula (III), a reduction in capacity retention rate during high temperature storage tended to be reduced.

$$M:M1=90:10 \text{ to } 95:5 \tag{III}$$

When an increase in BET specific surface area of the negative electrode was reduced, a side reaction between the electrolyte solution and the negative electrode was thought to be reduced.

Based on results of Nos. 21 to 23, when M, M1, and M2 additionally satisfied the following formula (IV), a reduction in capacity retention rate during high temperature storage tended to be reduced.

$$(M+M1):M2=100:0.5 \text{ to } 100:1 \tag{IV}$$

When an increase in BET specific surface area of the negative electrode was reduced, a side reaction between the electrolyte solution and the negative electrode was thought to be reduced.

The above embodiments and examples are only examples and should not be considered as restrictive. The technical scope defined by the description of the claims includes meanings equivalent to the scope of the claims and all modifications within the scope of the claims.

What is claimed is:

1. A method of producing a negative electrode for a nonaqueous electrolyte secondary battery, the method comprising:
    preparing a first dispersion solution consisting of mixing a negative electrode active material having a BET specific surface area of 3 m²/g or more and 8 m²/g or less, a first carbon material having a BET specific surface area of 30 m²/g or more and 100 m²/g or less, a thickener, and a solvent so that the thickener is adsorbed to the negative electrode active material and the first carbon material;
    preparing a second dispersion solution by mixing the first dispersion solution and a second carbon material having a BET specific surface area of 200 m²/g or more and 500 m²/g or less;
    prepare a negative electrode paint consisting of mixing the second dispersion solution and a binder so that the binder is selectively adsorbed to the second carbon material; and
    applying the negative electrode paint to a surface of a negative electrode current collector and drying the negative electrode paint,
    wherein the binder is different than the thickener, when
    a mass of the negative electrode active material is represented as M,
    a mass of the first carbon material is represented as M1, and
    a mass of the second carbon material is represented as M2, M, M1, and M2 satisfy the following formulae (I) and (II):

$$M:M1=80:20 \text{ to } 95:5 \tag{I}$$

$$(M+M1):M2=100:0.5 \text{ to } 100:2 \tag{II}$$

2. The method according to claim 1, wherein the negative electrode active material has a BET specific surface area of 3 m²/g or more and 6 m²/g or less.

3. The method according to claim 1, wherein the first carbon material has a BET specific surface area of 30 m²/g or more and 70 m²/g or less.

4. The method according to claim 1, wherein the second carbon material has a BET specific surface area of 200 m²/g or more and 300 m²/g or less.

5. The method according to claim 1, wherein M and M1 satisfy the following formula (III):

$$M:M1=90:10 \text{ to } 95:5 \tag{III}$$

6. The method according to claim 1, wherein M, M1, and M2 satisfy the following formula (IV):

$$(M+M1):M2=100:0.5 \text{ to } 100:1 \tag{IV}$$

7. A method of producing a nonaqueous electrolyte secondary battery, comprising
    producing the negative electrode for a nonaqueous electrolyte secondary battery according to the method of producing a negative electrode for a nonaqueous electrolyte secondary battery according to claim 1.

8. The method according to claim 1, wherein any binder is added after the thickener.

9. The method according to claim 1, wherein the thickener is included in the first dispersion solution in an amount such that all the thickener is adsorbed to the first carbon material and no thickener is adsorbed to the second carbon material.

10. The method according to claim 1, wherein the BET specific surface area of the negative electrode active material is 4 m²/g or more and 8 m²/g or less.

11. The method according to claim 1, wherein the BET specific surface area of the negative electrode active material is 6 m²/g or more and 8 m²/g or less.

12. A method of producing a negative electrode for a nonaqueous electrolyte secondary battery, the method comprising:
    preparing a first dispersion solution consisting of mixing graphite having a BET specific surface area of 4 m²/g or more and 8 m²/g or less, carbon black having a BET specific surface area of 30 m²/g or more and 100 m²/g or less, carboxymethylcellulose, and water;

preparing a second dispersion solution by mixing the first dispersion solution and carbon black having a BET specific surface area of 200 m²/g or more and 500 m²/g or less;

preparing a negative electrode paint consisting of mixing the second dispersion solution and styrene-butadiene rubber so that the styrene-butadiene rubber is selectively adsorbed to the carbon black having a BET specific surface area of 200 m²/g or more and 500 m²/g or less; and applying the negative electrode paint to a surface of a negative electrode current collector and drying the negative electrode paint, wherein when a mass of the graphite is represented as M, a mass of the carbon black having a BET specific surface area of 30 m²/g or more and 100 m²/g or less is represented as M1, and a mass of the carbon black having a BET specific surface area of 200 m²/g or more and 500 m²/g or less is represented as M2, M, M1, and M2 satisfy the following formulae (I) and (II):

$$M:M1 = 80:20 \text{ to } 95:5 \tag{I}$$

$$(M+M1):M2 = 100:0.5 \text{ to } 100:2 \tag{II}.$$

13. The method according to claim 12, wherein the styrene-butadiene rubber is added in a proportion of 0.1 mass % to 3 mass % with respect to the total amount of M+M1+M2.

14. The method according to claim 12, wherein the styrene-butadiene rubber is added in a proportion of 0.5 mass % to 1.5 mass % with respect to the total amount of M+M1+M2.

15. The method according to claim 12, wherein the carboxymethylcellulose is added in a proportion of 0.1 mass % to 3 mass % with respect to the total amount of M+M1+M2.

16. The method according to claim 12, wherein the carboxymethylcellulose is added in a proportion of 0.5 mass % to 1.5 mass % with respect to the total amount of M+M1+M2.

17. The method according to claim 12, wherein:
the styrene-butadiene rubber is added in a proportion of 0.1 mass % to 3 mass % with respect to the total amount of M+M1+M2, and
the carboxymethylcellulose is added in a proportion of 0.1 mass % to 3 mass % with respect to the total amount of M+M1+M2.

18. The method according to claim 12, wherein the BET specific surface area of the graphite is 6 m²/g or more and 8 m²/g or less.

* * * * *